United States Patent [19]
Walker

[11] Patent Number: 4,570,958
[45] Date of Patent: Feb. 18, 1986

[54] CARRIER FOR SUITCASES, LUGGAGE, GARMENT BAGS, AND THE LIKE

[76] Inventor: Brooks Walker, 1280 Columbus Ave., San Francisco, Calif. 94133

[21] Appl. No.: 620,060

[22] Filed: Jun. 13, 1984

[51] Int. Cl.⁴ .............................................. B62B 1/12
[52] U.S. Cl. ............................... 280/40; 280/47.13 R; 280/652; 280/659
[58] Field of Search ................ 280/35, 639, 656, 37, 280/38, 39, 40, 645, 646, 651, 652, 655, 659, 43.1, 47.26

[56] References Cited

U.S. PATENT DOCUMENTS

| | | | |
|---|---|---|---|
| 2,268,087 | 12/1941 | Schavocky | 280/47.26 |
| 3,827,707 | 8/1974 | Bierman | 280/654 |
| 3,947,054 | 3/1976 | Hall | 280/654 |
| 4,175,769 | 11/1979 | Kazmark | 280/654 |
| 4,281,849 | 8/1981 | Chardick | 280/655 |

FOREIGN PATENT DOCUMENTS 614687 12/1926 France .............................. 280/38

Primary Examiner—Joseph F. Peters, Jr.
Assistant Examiner—Everett G. Diederiks, Jr.
Attorney, Agent, or Firm—Flehr, Hohbach, Test, Albritton & Herbert

[57] ABSTRACT

A carrier adapted for transporting luggage, suitcases, garment bags and such articles. A support with wheel supports swingably attached to the support. Wheels are rotatably mounted on said wheel supports, such that the wheels and wheel supports are adapted to be moved between an inactive position and an active position. The support, the wheel supports and wheels are adapted to be arranged in a substantially coplanar relationship for ease of storage and transportation when not in use.

3 Claims, 11 Drawing Figures

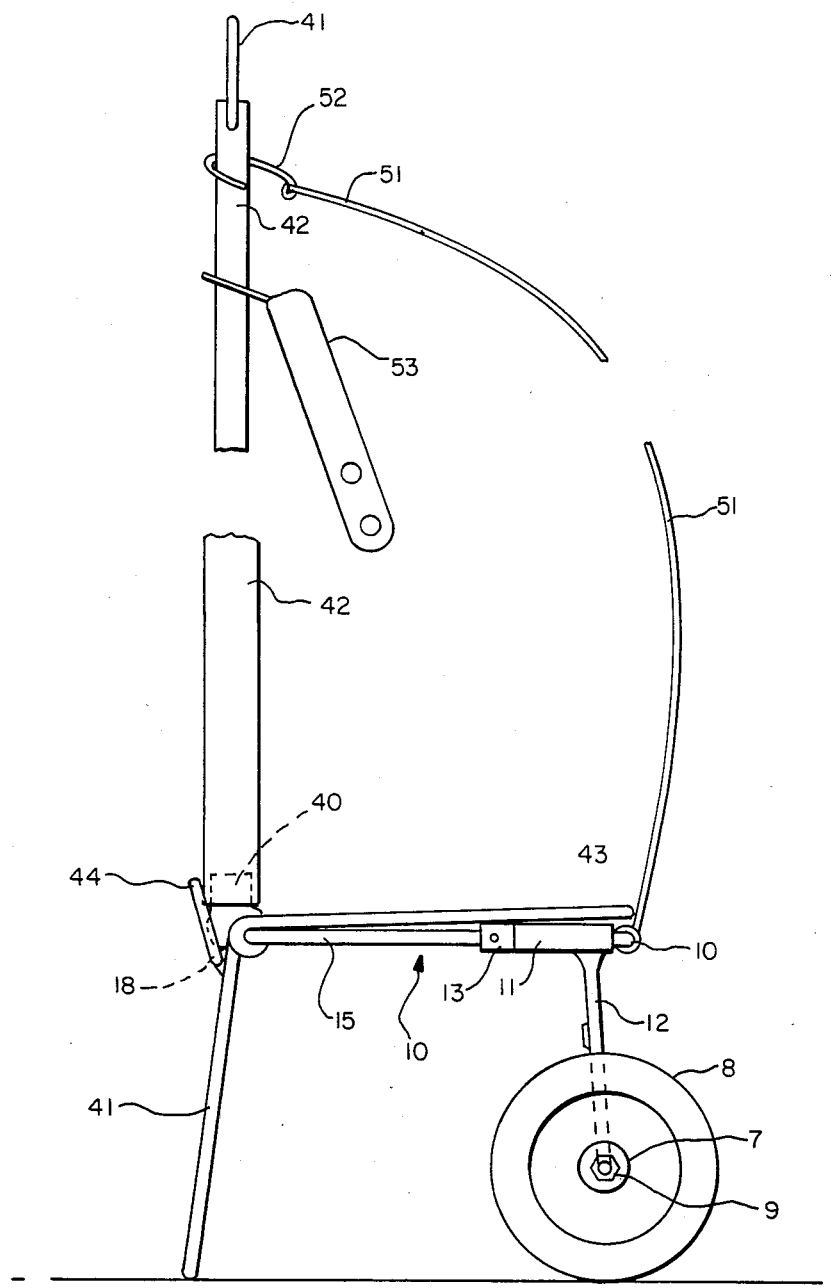
FIG.—1

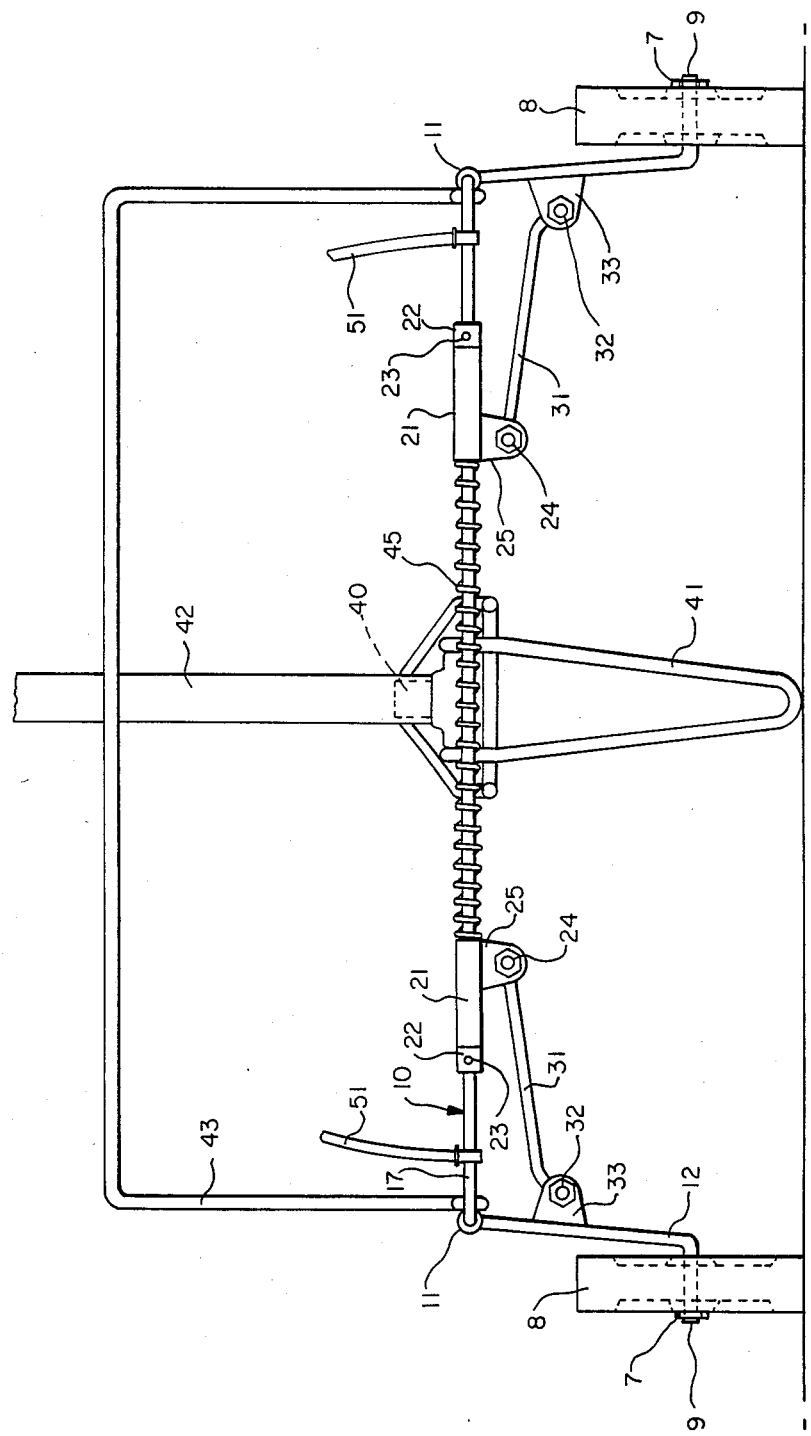
FIG.—2

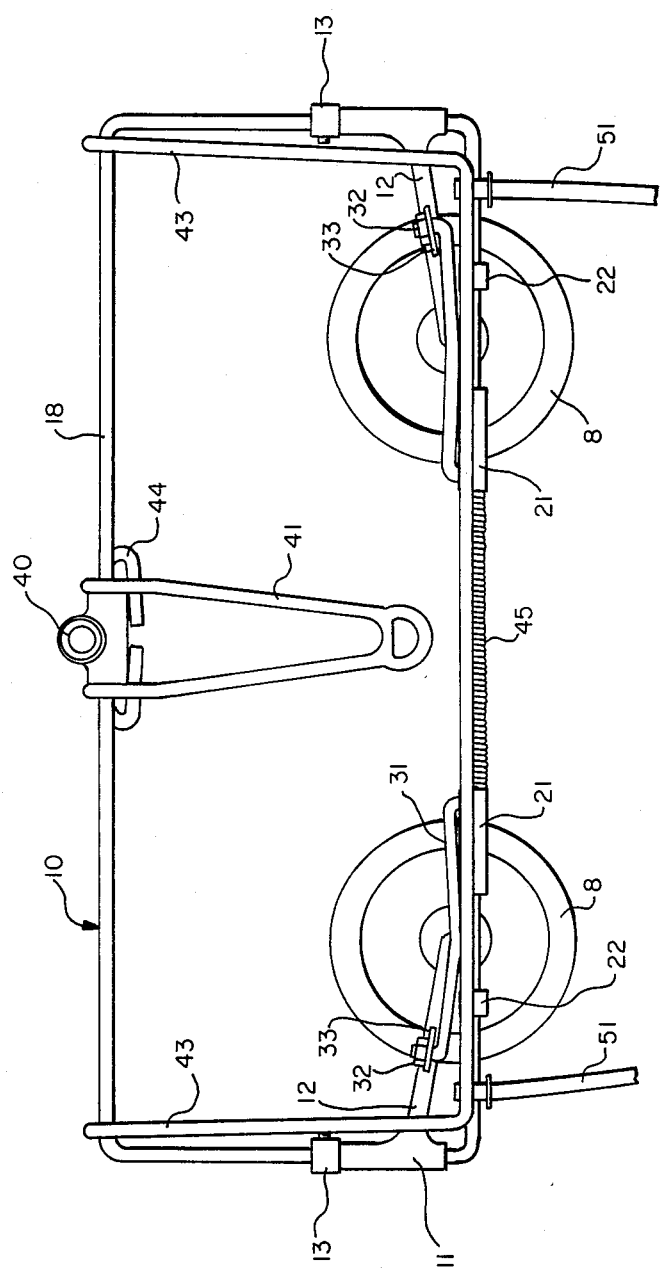
FIG.—3

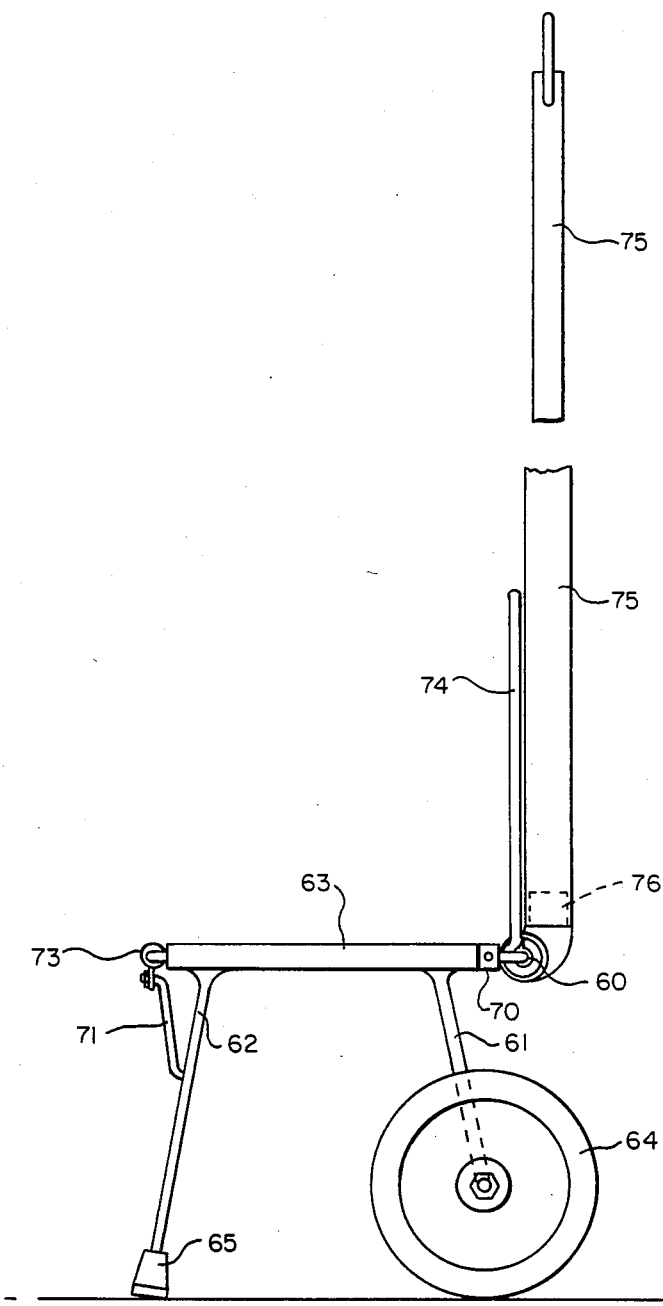
FIG.—4

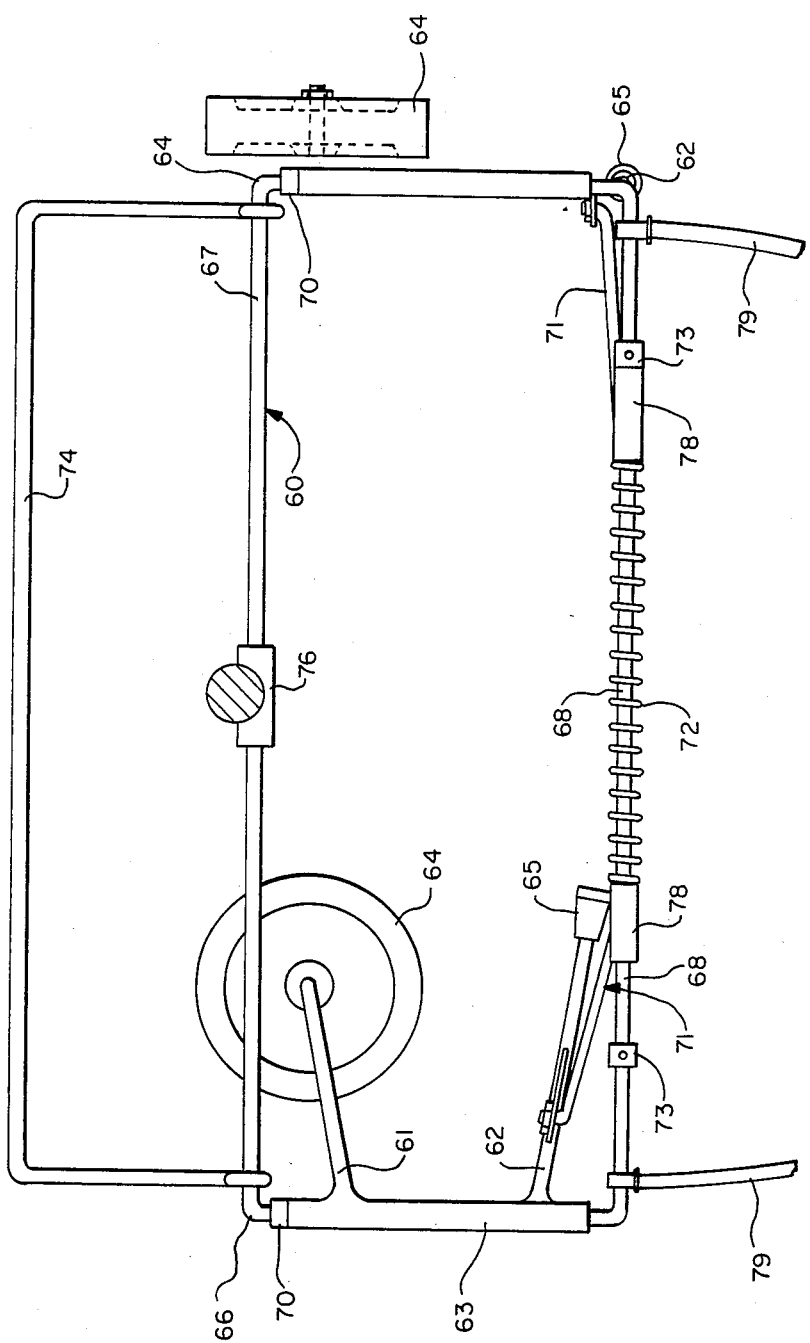
FIG.—5

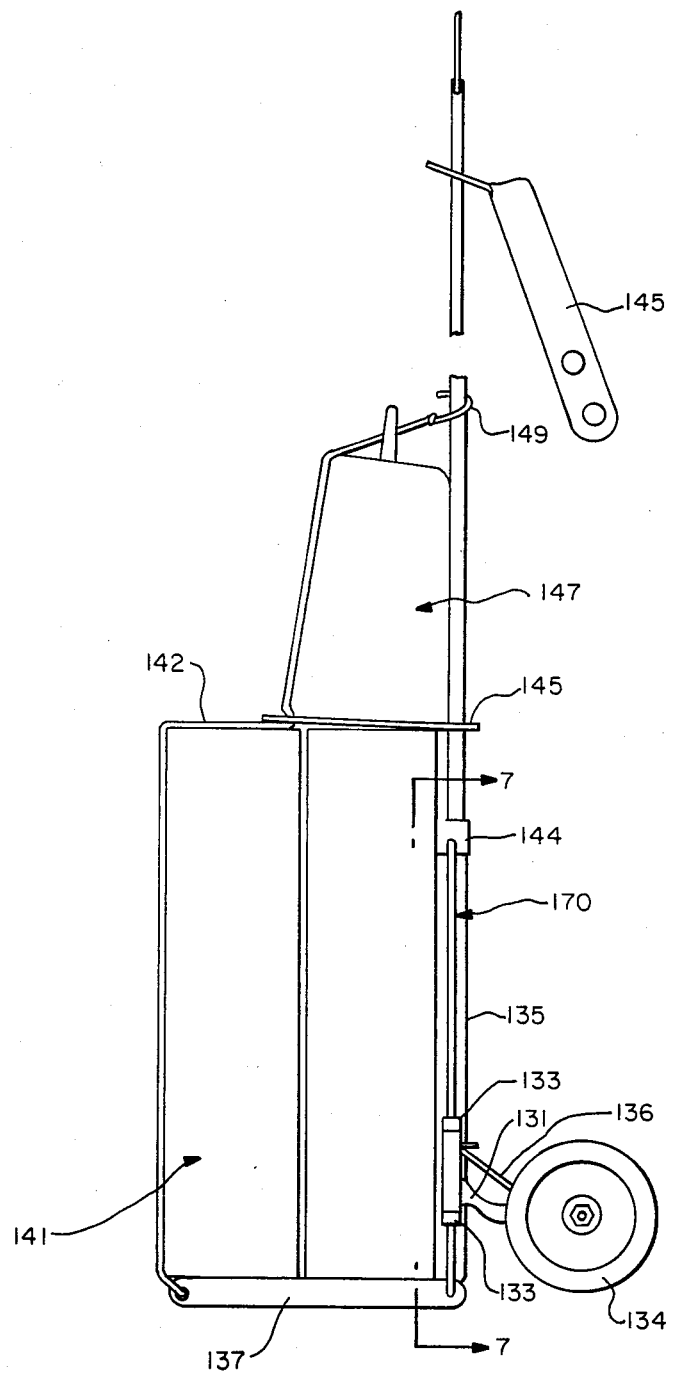
FIG. —6

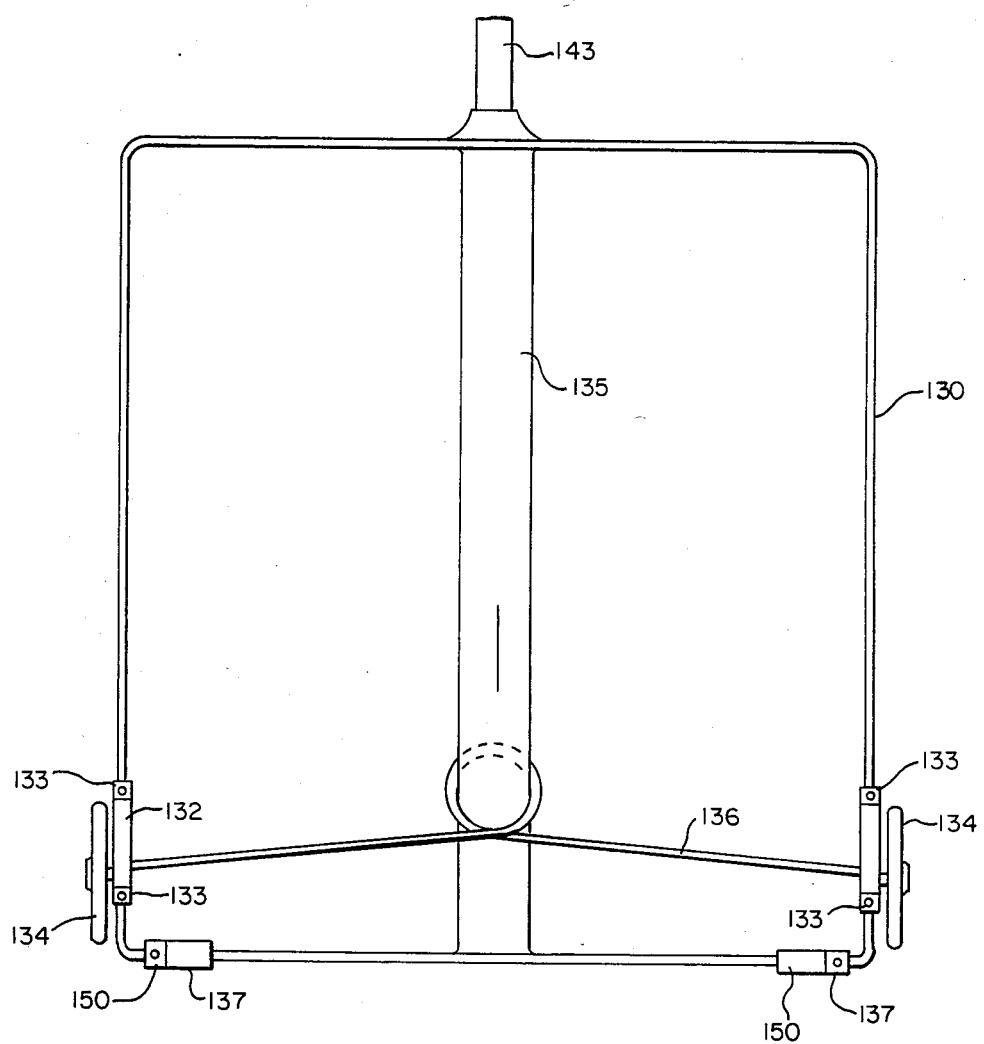
FIG.—7

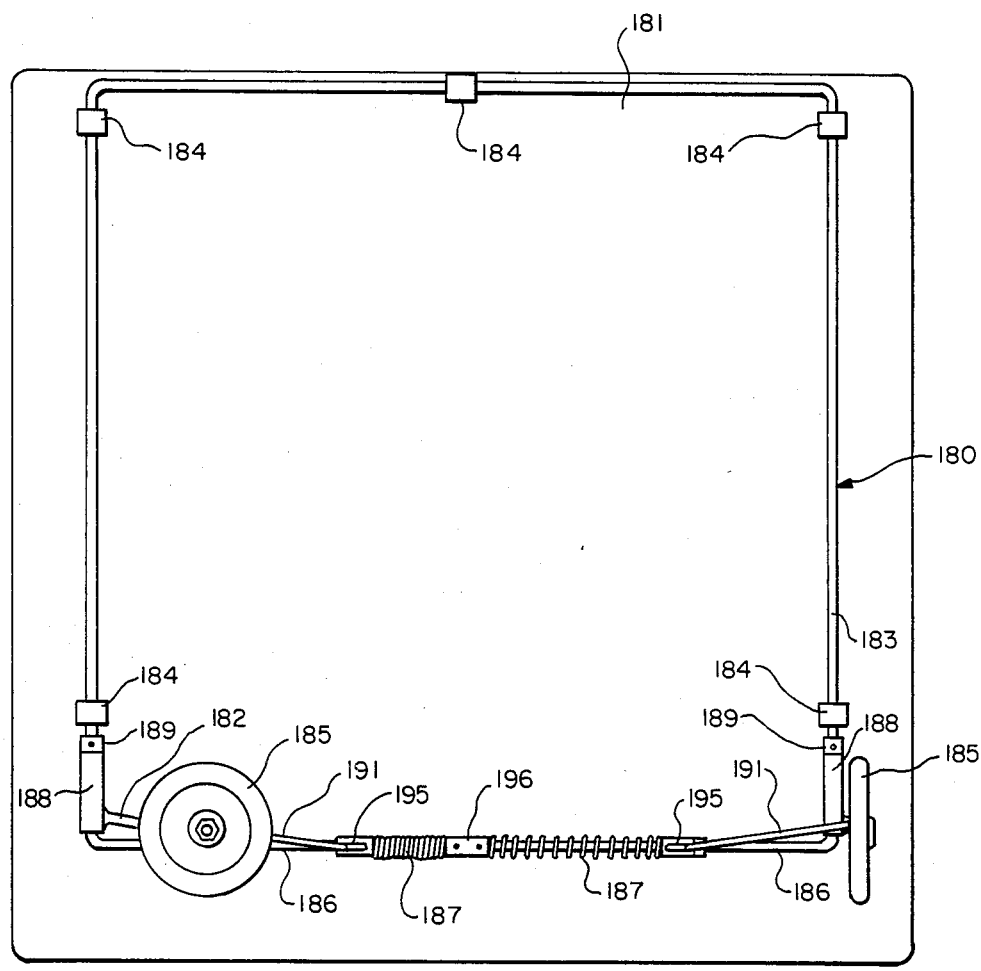
FIG.—8

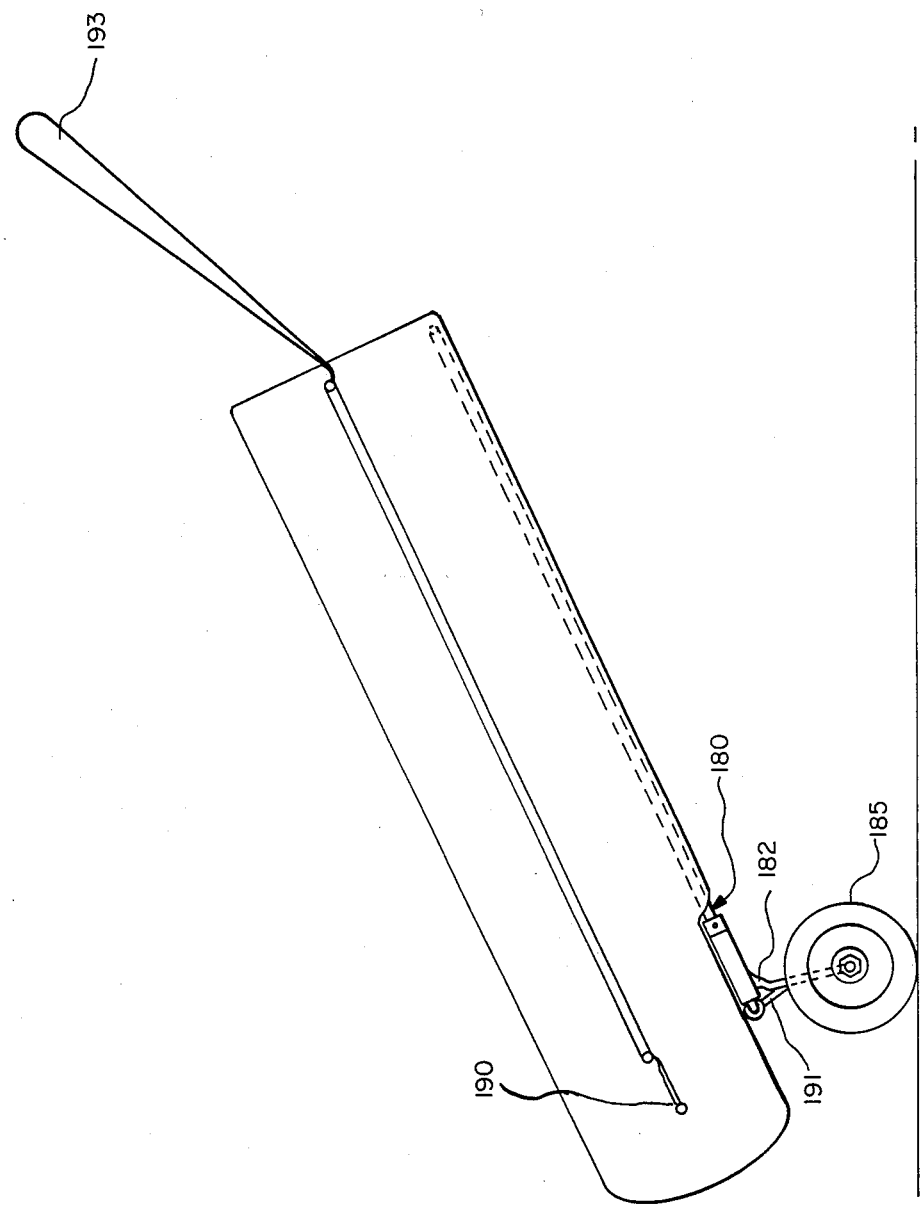
FIG.—9

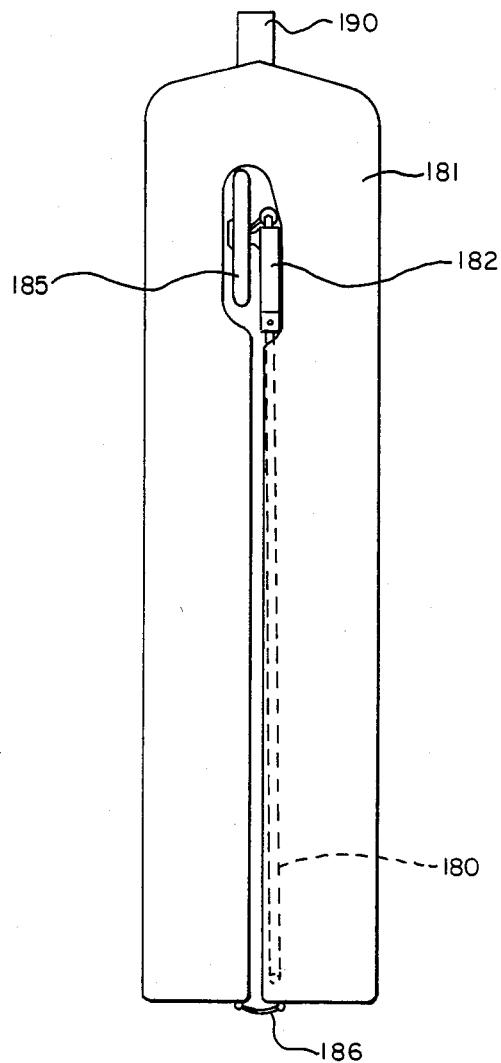
FIG.—10
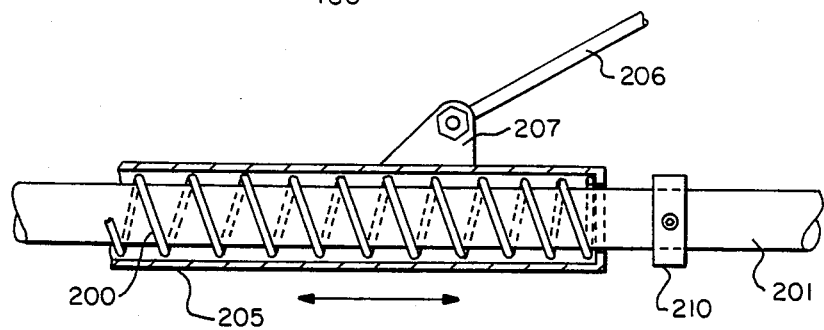
FIG.—11

CARRIER FOR SUITCASES, LUGGAGE, GARMENT BAGS, AND THE LIKE

This invention relates to a wheeled carrier particularly adapted fo transporting suitcases, garment bags, luggage, and other such articles.

It is becoming more and more desirable for persons to be able to carry one or more pieces of luggage or other articles without being substantially weighed down or otherwise encumbered. Particularly as airports are getting larger, the distance between the gate areas, the ticket counters/check-in areas and the parking areas have increased. There is also the attendant problems of moving luggage, garment bags, suitcases and such other articles to and from ones residence to a vehicle, in a hotel, motel or other lodging, across parking lots, and in otherwise moving or transporting such articles any distance.

Many travelers including business persons prefer to carry baggage on board airplanes, rather than checking baggage at ticket counters. This is a need which allows for ease of storage of the baggage and carrier in overhead areas or other storage areas.

The use of this invention allows the user to transport luggage, suitcases, garment bags and such articles in a relatively simple manner without the use of both hands and without the need to exert the energy to lift and carry such articles. This invention also allows ease of storage of bags which is attached and of itself when unattached.

The present invention relates to a wheeled carrier which can be folded in essentially a flat planar orientation which can easily fit into a briefcase, suitcase, or other type of storage receptacle when not in use. It is adapted to be smaller and thus take less room than the many prior art device.

The present invention also relates to a wheeled carrier which can be permanently mounted on a suitcase, garment bag, or other article which has wheels can be folded into substantially planar orientation.

Moreover, the present invention provides for spring loaded wheels, whereby the wheels are held by said spring means in the operative wheeling position.

It is an object of the present invention to provide a wheeled carrier for suitcases, luggage, garment bags, and such articles which is light weight, yet strong enough to carry such loads and which is easily stored when not in use.

A further object of this invention is to have a wheeled carrier particularly adapted for transporting suitcases, garment bags, luggage and such articles which has spring means for urging the ground wheels into the load carrying wheeling position and spring means also provide a force to hold the two wheels in the inactive position.

Another object of the invention is to provide a wheeled carrier particularly adapted for transporting suitcases, garment bags, luggage, and such other articles which is provided with means for allowing the wheeled carrier to be in an upright rest position while supporting a load of suitcases, garment bags, luggage, and such other articles.

Another object of the invention is to provide a wheeled carrier particularly adapted for transporting suitcases, garment bags, luggage and such other articles with an elastic member for securing the articles supported by the carrier to the carrier when being transported.

Another object of the invention is to provide a carrier allowing ease of stacking articles carried on said carrier.

Another object of the invention is to provide a garment bag with a wheeled carrier attached to said garment bag by the frame means of the wheeled carrier.

Other object and advantages will be apparent from the following description.

FIG. 1 is a side elevational view of the carrier embodying the present invention.

FIG. 2 is a front view of the embodiment of the invention of FIG. 1.

FIG. 3 is a top elevational view of the embodiment of FIG. 1 without the elongated member removed and the wheels and wheel supports folded into the substantially planar orientation with respect to the frame.

FIG. 4 is a side elevational view of a modified embodiment having two legs.

FIG. 5 is a top elevational view of the modified embodiment of FIG. 4 with one wheel and wheel support folded and the other wheel and wheel support in the active wheeling position.

FIG. 6 is a side view of a modified embodiment having a modified base with articles attached.

FIG. 7 is a view taken along the lines 7-7 of FIG. 6 with an elongated frame to better illustrate the embodiment.

FIG. 8 is a rear view of a modified form of the invention mounted on an article.

FIG. 9 is a side view of the embodiment of FIG. 8 in the active wheel rolling position.

FIG. 10 is a side view of the embodiment of FIG. 8 when the article is folded over the frame and wheels are in the inactive position nested between folded sides of bag.

FIG. 11 is a sectional view of a modified slide member with coil spring for use with the present invention.

In practicing the present invention, a wheel carrier for luggage, suitcases, garment bags, and the like having a frame means which supports a generally downward facing side of the articles which it transports, is provided with wheels which are carried by wheel supports swingably connected to said frame means. The wheel supports are connected to the frame in a manner which allows the wheels to be moved from their active position, below the frame means to a position in which they are in a substantially planar orientation relative to the frame means. Spring means are provided to urge and hold said wheels in their active position. An elongated member is detachably secured to said frame for rolling or pulling said carrier when the wheels are in their active position and engage the supporting surface. Various modified forms of the structure employed for carrying baggage are illustrated and will now be described in detail.

In detail, and first referring to FIGS. 1 through 3, a carrier frame 10 is shown with side members 15,16 and longitudinal members 17,18. Wheel supports 12 are swingably mounted to the frame 10 by tubes 11. Stops 13 are provided to prevent movement of tubes 11 along the side members 15,16 of frame 10. Wheel supports 12 are provided with a turn portion which functions as an axle for wheels 8 which are rotatably secured on said turned portion of wheel support 12 by nuts 9 and washers 7, or other suitable means. Tubes 21 are slidably mounted on frame 10. Linkages 31 join wheel supports 12 to tube 21 at brackets 25 and 33 by nuts 24 and 32 or by other suitable means. Coil spring 45 is mounted on said frame 10 under compression between tubes 21. Stops 22 are secured to frame 10 by screw 23 and provide a stopping point for tube 21 as it moves along the longitudinal member 17 of frame 10. It will be understood that other suitable stopping means may be used.

Frame 10 is provided with a handle mount 40 which is fixed to frame 10 on the longitudinal member 18. Handle mount 40 is provided with threads or other suitable means to removably secure handle 42 to longitudinal member 18 of frame 10. Leg 41 is swingably connected to longitudinal member 18 of frame 10 on each side of handle mount 40. Arms 44 which is fixed to said leg 41 provides a stop so that leg 41 is in a position to provide a third point of contact being two wheels 8 and leg 41 with the ground to support said carrier and load thereon when standing. Thus, as shown in FIGS. 1 and 2, leg 41, when in its ground engaging position, is slightly past center to provide better stability.

U-shaped member 43 is swingably connected to frame 10 on longitudinal member 18 so that when in the open active position (FIG. 2) it abuts the handle 42 and provides lateral support to articles placed on said carrier.

A yieldable surgical rubber member 51 is secured at both ends of frame 10 on longitudinal spring carrying member 17. A hook 52 is provided substantially midway along said yieldable member 51. The handle 42 is provided with flexible tab 53 which may be moved along said handle 42. The flexible tab 53 may also be provided with a void adapted to permit the surgical rubber member 51 to pass through the void and thereby hold the member 51 in proximity to the handle 42 to better secure multiple articles carried by said frame.

From the above described structure it will be apparent that the carrier may be arranged in the stored position leg from the active position exerting force perpendicular to the plane of rotation of the wheels 8. The force applied to the wheel supports 12 by the spring 45 through linkages 31 urges the wheels 8 to remain in the active or inactive positions once arranged in that position. The wheels 8, linkages 31, brackets 25,33, and frame 10, when the wheels 8 are folded to their inactive position form a substantially planar structure approximately 2½ inches high from the outer rim of the wheels 8 to the top edge of the brackets 33. The leg 41 can be swung inwardly so that it can become substantially planar with and bounded by the frame 10. Handle 42 can be unscrewed or otherwise detached from mount 40 and U-shaped support member 43 can be pivoted on said frame 10 to a closed position, whereby it is substantially flat with the frame 10, as shown in FIG. 1.

It will also be recognized that the use of a telescoping handle or handle that is composed of several detachable members can also improve the collapsible, portable nature of the present device. The elastic member 51 can be used to bind the entire device in its inactive position including a telescoping or otherwise portable handle.

The operation of the device in its active position is also apparent from the above description. Luggage, suitcases, or such articles may be placed on the frame. Surgical rubber member 51 is placed over the outside of the articles on the frame 10 and then is secured to the handle 42 by hook 52. It will be recognized that the articles are thus bounded by the frame 10, the surgical rubber member 51, the handle 42, and the U-shaped member 43 which is in an open position. The flexible tab 53, which can be made of rubber, webbing or leather or the like, is used to keep the surgical rubber member 51 and to aid in keeping single articles and multiple articles carried by the device in alignment with and in proximity to the handle. It should be realized that in some cases more than one tab may be necessary. It will also be recognized that tab 53, when used to hold articles on the carrier close to handle 42, will also tend to prevent rotational type movement of the articles between each other and between the articles and the carrier.

It is understood that this invention may use other suitable members, such as shock cord or other strapping material with suitable clasps or buckles, in place of the surgical rubber members. The requirement is that the member is capable of tightly securing luggage or such to the handle and the frame. This can be accomplished through the internal characteristics of surgical tubing or by standard strapping materials and buckling devices.

In an at-rest position wheels 8 and leg 41 provide a stable base for the device and the articles carried thereby. The device can then be used to move the articles loaded by moving the leg 41 to a horizontal position parallel to frame 10 or other out-of-the-way position. This can be conveniently accomplished by the foot of the user. The device may then be tipped and then pushed or pulled by means of the handle 42 in the desired direction.

The modified carrier, as shown in FIGS. 4 and 5, has a frame 60 with wheel supports 61 and legs 62 fixed to tubular member 63 which is mounted on side members 66, 69 of frame 60. Wheels 64 are mounted on wheel support 61 in a suitable manner. Leg supports 62 are provided with feet 65 to aid in supporting the frame in conjunction with wheel supports 61 and wheels 64. Stops 70 are provided to prevent movement of the tubular member 63 along the side member of frame 60. Linkages 71 are slidably connected to a longitudinal member 68 of the frame 60 and are connected to the wheel supports at leg 62. The spring 72 acts upon slidable elements 78 which is transmitted through the linkages 71 to the leg 62 which is connected to wheels 64 by wheel supports 61 and tubular member 63. Stops 73 prevent movement of the linkages 71 when wheel supports 61 and wheels 64 are in the active wheeling position. U-shaped member 74 is swingably connected to the other longitudinal member 67 of frame 60 such that U-shaped member 74 may be swung from an inactive position in a relatively planar orientation to the frame to an active position whereby it abuts the elongated handle 75 which is removably attached to the longitudinal member 67 of frame 60 at handle mount 76.

The use and operation of this device in its active and inactive position should be apparent from the above description. Luggage or suitcases or such other articles may be placed upon frame 60 and an elastic member 79 such surgical rubber tubing or shock cord may be placed on the frame and used to secure article by attaching along the longitudinal member of frame 60 opposite handle 75 to place over the article on the frame 60 and then secure to handle 75 in a known manner. When multiple articles are placed upon the frame 60 it may be convenient to use a separator which is yieldable and is provided with apertures for passing the elastic member 79 or other securing member used in securing the article to said frame and the handle 75.

It will be recognized that the frame may be left in a rest position upon the wheels 64 and feet 65 whereby the load secured to said frame is in an at rest position and suitably supported thereby. It will also be recognized that in using the wheeled carrier that a force or torque directed such as to cause rotation of the frame so as to the lift feet 65 out of contact with the ground will allow further force transmitted along the handle 75 to urge the wheels 64 to rotate and allow transportation of said wheeled carrier along said surface.

It will also be recognized that this device offers a means for creating a compact device when in the inactive position. The legs 62 and feet 65 and wheel supports 61 and wheels 64 can be rotated relative to said frame through its apertures members 63 whereby they are placed in a substantially planar orientation with respect to said frame 60. In the present embodiment it should also be realized that linkages 71, when legs 62, feet 65, wheel supports 61 and wheels 64 are moved to the inactive position, are moved such that it is in the past center position relative to frame 60 and the action of coil spring 72 through linkages 71 will urge the wheel supports 61 and wheels 64, legs 62 and feet 65 to remain in the out-of-the-way inactive position. It should also be realized that a detent can be used to hold the device in an inactive position if another form of spring means is used, or if different linkage system is used, or if a trimmer and more secure hold of the wheels 64, legs 62, and wheel supports 61 in the inactive position is desired.

The U-shaped member 74 may be rotated around the longitudinal member to which it is attached such that it is in a substantial planar orientation relative to said frame 60. In this embodiment it should also be realized that the feet 65 can also function as a detent in conjunction with the slide member 78 or the longitudinal member 68 to hold the U-shaped member 74 in its inactive position when said legs 62 and wheel supports 61 are in their inactive positions. The handle 75 can also be removed from the handle mount 76 and thus to create a substantially flat profile for easy storage of the present embodiment. If a collapsible or retractable handle is used, it may be secured to said frame 60 similar to that already disclosed.

It should be understood that the U-shaped member may be made so that its side members are shorter than the side members of the frame so that it will rest inside of the frame when in the inactive position.

Referring now to FIGS. 6 and 7, another embodiment of the present invention is demonstrated, having frame 130, wheel supports 131 with tubular end 132 connected on said frame 130 and prevented from moving along said frame 130 by stops 133. Wheels 134 is rotatably mounted on said wheel supports 131. Torsion spring 136 has its action transmitted along its extended members which are flexibly attached to wheel supports 131 to secure and hold said wheel in the upright and engaged position. Torsion spring 136 is mounted on guide member 135 which extends between frame members and substantially between said wheels. Links 137 are swingably connected to said frame 130 and support article 141 along its base. Links 137 are prevented from moving along the frame 130 by virtue of the proximity of the corner of the frame and stops 150 fixed on said frame 130. Surgical rubber tubing 142 is connected at its ends by suitable means such as plugging the ends of the tubing with a rubber or metal ball with a diameter greater than if the links 137 through which the tubing passes to links 137 and extend along article 141 through aperture in rubber tab 145 which is slidably connected to said handle 143 which is removably fixed to said frame 130 at handle mount 144. The elastic member extends upward and is secured to the handle 143 by hook 149 so as to secure articles 147 and 141 to the carrier and the handle 143.

The operation and the functioning of the device should be apparent from the above description in that said wheels 134 and wheel supports 131 may be moved from an active position to an inactive position in a substantially planar orientation relative to said frame. It will be recognized that in certain cases dependent upon the nature of the springs used that it may be necessary to provide a detent (not shown) to hold said wheel in the inactive position when it has been manually placed in the inactive position. Likewise it will be recognized that the wheels can be moved by manual means sufficient to overcome the force holding said wheels and wheel supports in the inactive position to an active position aided by the action of the spring 135. By using an article with a fairly stiff or rigid bottom, a base is provided whereby the carrier can rest upon a base formed by the linkage 137. When movement of the carrier as a unit is desired upon the wheels a torque applied upon handle 143 in a direction away from the luggage or articles carried upon said carrier will cause the wheels to engage the surface and to carry the load of such articles.

It will be recognized that one of the features of the above described structure is that the weight of the articles placed upon the carrier will be concentrated when in the load carrying position in close proximity to the intersection of the frame 130 and links 137 whereby there is little tendency for links 137 to swing downwardly when articles are being carried upon the wheeled carrier. It should also be understood that the use of other types of spring means would be equivalent in the present invention including various types of torsion springs and zig-zag torsion type spring with increased k-constant torsion springs.

In FIG. 11 spring 200 is shown centered on a section of a frame 201. The spring 200 extends within sliding member 205. Linkage 206 which is interconnected with the wheel in a manner not shown is pivotally connected to bracket 207 which is fixed to the sliding member 205. The sliding member 205 is provided with a small apertured end which the spring 200 acts upon. Stop 210 is provided to limit the travel of the sliding member 205 along the frame 201 to provide a stop for the wheel (not shown) to be held in the load carrying position. This modified slide member 205 will be understood to be made so that the larger apertured end slides over the spring 200 whether the spring is compressed or extended so as not to bend on the exterior spring 200. The operation and advantages are thus apparent in that a greater spring action can be attained without increasing the longitudinal length of the frame to accommodate a larger spring.

The present invention is also adapted for use as a wheeled carrier permanently mounted on an article of luggage.

Referring to FIGS. 8-10, frame 180 is secured to garment bag 181 at points 184 and such other places as necessary. Wheel supports 182 are swingably connected to the frame 180 by tubular members 188 encompassing said frame 180 along side members 183. The tubular members 188 are prevented from moving along side member 183 by stops 189 and by the proximity of longitudinal member 186. Wheels 185 are rotatably mounted on said wheel supports 182. Coil springs 187 are mounted and centered on the longitudinal member 186 between a spacer 196 which is fixed to the longitudinal member 186 of frame 180. Linkage 191 is pivotally connected at one end to wheel supports 182 and is slidably mounted on longitudinal member 186 by the tubular end of linkage 191. Springs 187 act upon linkage 191 through slidable member 195 to urge and hold said wheels in the active wheeling position. The wheels 185 when folded to the inactive position cause the linkages 191 which have a slight curvature near the wheel to pass and engage the longitudinal member 186 of frame 180 and function as a detent against the action of the spring 187. It will also be understood that the wheels 185, if properly positioned and having a concave tread or with a rounded tread, when folded to the inactive position could act as a detent when the tire passes the frame 180. Handle 190 is provided for ease of carrying the luggage when in the inactive position. It will also be recognized that if construction or other spring-types are used that a suitable means, such as a detent or other known methods may be substituted to hold the wheels 185 and wheel supports in the inactive position. For instance in the case of a garment bag which can be folded in both directions, the means for securing the bag with the wheels between the halves will ordinarily be sufficient to secure the wheels 185 in the inactive position for ease of carrying the luggage when the wheels are in the inactive position.

It will be understood from the above description that a handle or in this case a leash 193 may be added to the garment bag 181 to assist in movement of the article when the wheels 185 are in the active wheeling position. In this case, garment bag 181 is foldable and securable in both directions along its transverse axis by retainer 186 as is demonstrated in FIGS. 9 and 10. This allows added convenience and safety in the use of this carrier in that when checking the garment bag 181 in airline travel, for instance, the wheels are in the inactive position, flat against the frame and protected between the halves of the garment bag. Upon receipt of the bag at the luggage return, simply reversing the fold and moving the wheels 185 to the active position allows use of the wheels to transport the luggage.

It should be apparent that the present invention shows frames which are rectangular. However, it should be realized that frames which have two parallel side members of substantially the same length are necessary to the present invention. It would be realized that the longitudinal members and even the position of the side members extending above the wheel support areas do not have to be perfectly rectangular and can be rounded and bound as is convenient for use or manufacture. It should therefore be understood that the term "substantially rectangular" has reference to the wheel supports and the portion of the frame to which they are attached being straight and paneled. It should also be recognized that this invention may be used with other types of springs, other than the coil and linear springs here disclosed, without departure from the nature and scope of the present invention.

It should be further understood that other spring means types or mountings may be substituted without departing from the nature and scope of the present invention.

From the foregoing it can be seen that the carrier as defined and disclosed in this invention is not limited to a particular type or shape of frame or article to be carried. It should be recognized that the only requirement of the carrier is that it is adapted to carry articles on its frame in a manner disclosed or other known manner and it is capable of having spring actuated wheels and foldable in a substantially planar orientation relative to the frame.

From the foregoing it can also be seen that a carrier for articles such as luggage, suitcase, garment bags and the like has been described. The luggage carrier, with the action of the spring means urging and holding the wheels in position, when its wheels are in the active wheeling position allows transportation of articles placed thereon as a unit without the use of both hands. The wheels when folded in an inactive position allows the device to become substantially planar in its appearance and thus easy for storage or baggage handling. While several embodiments of the invention have been described and illustrated, it will be apparent to those skilled in the art that various changes, omissions, additions, and substitutions may be made in the construction of the apparatus and that the apparatus may be put to uses other than those described without departing from the spirit of the invention as described in the appended claims.

What is claimed is:

1. A wheeled carrier for articles such as suitcases, garment bags, luggage, and other articles comprising:
   a frame of substantially rectangular shape having two longitudinal members and at least two side members;
   wheel supports swingably secured to said side members of said frame by an aperture formed on the end of said wheel support which allows the wheel support to pivot about the frame on which it is secured;
   wheels rotatably secured to said wheel supports;
   said wheel supports adapted to be swung so that said wheels may be selectively positioned in an inactive position, where said wheels are substantially planar with said frame and an active wheeling position, where said wheels are substantially perpendicular to and below said frame and parallel to each other wheel;
   said frame adapted to engage a generally downwardly facing side of said article;
   an elongated member removably attached to said other longitudinal member of said frame;
   said elongated member adapted to being used for pulling said frame when said wheels are in the active wheeling position;
   means for providing a stable base for said frame when said wheels are in their active wheeling position;
   coil spring means carried by one of said longitudinal members of said frame;
   linkages connecting said spring means and said wheel supports such that the action of said spring means is transmitted to said wheel supports to urge and hold said wheel supports in the active wheeling position;
   stops to prevent movement of said linkages along said one longitudinal member of said frame;
   means for securing said article and frame together for movement as a unit on said wheels;
   a U-shaped member swingably mounted to the frame which provides lateral support to articles carried by said frame especially when in the active wheeling position; and wherein each wheel when in the active wheeling position is located substantially below one of the ends of the longitudinal member of said frame; and
   means for providing a stable base when said wheels are in the active wheeling position including the wheels and a member swingably supported on the other of the longitudinal members of said frame such that said swingable member can be moved from its active to inactive positions independent of the position of said wheels said swingable member being substantially U-shaped and including a stop when the U-shaped leg member is located in its active position below said frame.

2. A wheeled carrier according to claim 1 wherein said wheel support is swingably attached to the frame by an aperture formed on the end of said wheel support which allows the wheel support to pivot about the frame on which it is secured.

3. A wheeled carrier according to claim 1 wherein said means for securing said article and frame is a flexible member fixed to the frame and adapted to pass over said article and be removably attached to the elongated member.

* * * * *